Nov. 25, 1969  G. H. LACY  3,480,464

LAMINATE MATERIAL AND METHOD OF MAKING

Filed Sept. 21, 1964

INVENTOR.
George H. Lacy
BY
AGENT
ATTORNEY

United States Patent Office 3,480,464
Patented Nov. 25, 1969

3,480,464
LAMINATE MATERIAL AND METHOD
OF MAKING
George H. Lacy, Rocky River, Ohio, assignor to The
Dow Chemical Company, Midland, Mich., a corporation of Delaware
Filed Sept. 21, 1964, Ser. No. 397,688
Int. Cl. B44d 1/14; D21h 1/18
U.S. Cl. 117—71
19 Claims

ABSTRACT OF THE DISCLOSURE

A wrapping or packing material is produced by coating a paper substrate with a polyolefin, vapor depositing a thin layer of metal onto the polyolefin coating and then depositing a polyolefin coating over the metal layer. Adhesion promoting agents, such as polyalkyleneimines, and oxidizing treatments, such as methane flame and electrostatic treatments, are employed to effect an improved bond between the layers of the structure.

---

Figure 1:
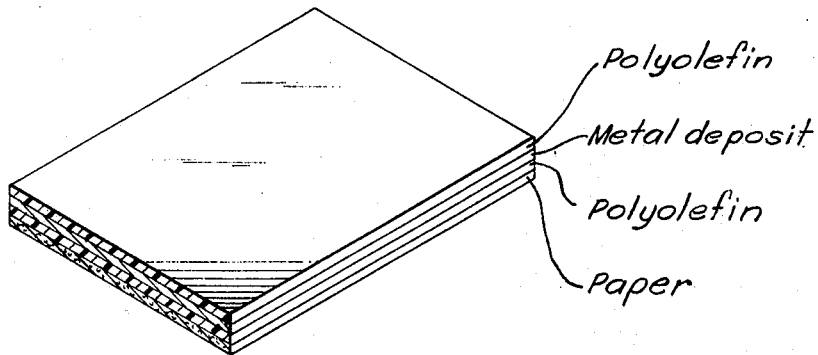

This invention relates to a laminate wrapping or packing material, and particularly laminate material adapted for the wrapping of foodstuffs and other consumer products.

Considerable efforts have been expended in developing laminate webs, sheets, foils, ribbons and threads and the like in order to achieve better functional properties as well as better appearance. Metal foils in combination with paper and with synthetic resinous materials have found widespread utility in preparing lustrous well appearing packages and overwraps in addition to providing excellent moisture vapor and gas vapor barriers where such properties are desired or required. Aluminum foil is employed presently almost exclusively as the metal foil in these laminate structures. A laminate of paper, aluminum foil and a thermoplastic resin, e.g., polyethylene has found popular acceptance wherein an arrangement of these materials is frequently employed such that the paper is on the outside, the aluminum foil as a barrier material between the paper and polyethylene, and the polyethylene forming an inert inner liner of the package against which faces the contents if material is packaged therein. Aluminum foil used in such structures, however, usually makes for a rather stiff as well as bulky and weighty wrapping or package, and it is often difficult, without danger of rupturing it or of creating a crinkly, uneven wrap, to cause the laminate material to conform closely and smoothly to the material or product being wrapped, especially if a rather irregularly shaped product is involved. It can also be appreciated that the expense of using a thick foil layer has its drawback from the standpoint of the cost of the metal itself and the increased costs of shipping the laminate itself or packages in which it is employed.

One means attempted to obviate the use of a thick foil is to vacuum metallize the metal onto a paper substrate and thus provide an extremely thin metal layer. This, however, has not proved successful or acceptable when good barrier properties are required. When the hot vaporized metal particles are deposited on the paper the paper tends to "outgas," i.e., the liberating of moisture vapor which causes an uneven metal surface having pin-hole imperfections. Obviously, these effects significantly limit the functionality of the laminate structure particularly as to appearance and as a barrier material.

Accordingly, it is the chief object and primary concern of this invention to provide a thin, lightweight, flexible, metallic laminate structure having an excellent appearance and barrier properties comparable to laminate structures containing a relatively heavy and thick foil layer.

The foregoing and additional objects and advantages are achieved by practice of the present invention which provides a composite laminate structure comprising a first or substrate layer of paper, a second layer of a film-forming non-aromatic hydrocarbon olefin polymer uniformly deposited over said first paper layer, a third layer of a metal uniformly deposited over said second layer of olefin polymer, and a fourth layer of a film-forming non-aromatic hydrocarbon olefin polymer uniformly deposited over said third layer of metal.

The advantageous and beneficial laminate structures of the present invention are prepared by first extrusion coating the paper substrate with the olefin polymer by expelling a molten sheet or screen of the polymer on the paper web and immediately cooling and solidifying the olefin polymer layer by contacting it with a smooth shiny chill roll. This provides a smooth, uniform coating of olefin polymer susceptible to having deposited thereon a smooth lustrous metal layer or coating by passing the polymer coated paper through a suitable vacuum metallizer. After the metal layer is uniformly deposited over the polyolefin layer, a second layer of an olefin polymer is deposited over the metal layer by extrusion coating a molten layer of the olefin polymer over the metal in the same fashion as the polymer coating is applied over the paper.

The laminate structure of the invention is perspectively illustrated in FIGURE 1 of the drawing.

Figure 2:
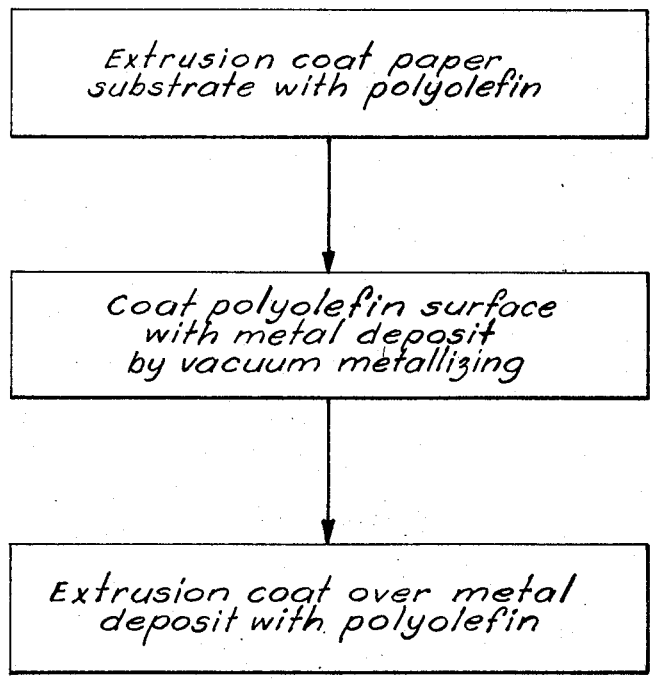

The preferred means for preparing the laminate structure in accordance with the invention is schematically illustrated in FIGURE 2 of the drawing.

As mentioned, the novel laminate material is advantageously employed as a package material or as an overwrap for packages. In this respect the present laminate material is unusually beneficial because of its good strength coupled with light weight and high degree of flexibility and excellent barrier properties. Frequently, the total thickness of the composite laminate structure may be as little as 1 to 2 mils. Of course, thicker structures can be made according to the dictates of the ultimate use. Additionally, and of course of paramount importance in preparing packages, the laminate material of the invention has excellent moisture and gas barrier properties. Moreover, packages developed of the laminate material are readily heat sealed which is a most desirable feature in that the employment of adhesives is obviated. Conventional packaging usually entails either an edge or fin seal and when a heat sealable resin is employed as one of the outer layers, the package is fabricated such that the heat seal is formed by fusing two of the resin surfaces together. Because of the relative thinness of the present structure the heat seal is quickly and efficiently formed even though the heating surfaces or platens may be applied to the paper side of the laminate structure. The polyolefin coating over the metal deposite thus serves to protect the metal against abrasion or chemical attack or the like and simultaneously provides a heat sealable layer. As indicated, the present laminate structure, while having the foregoing and additional favorable attributes and advantages can be made to have, when a transparent layer of polyolefin is applied over the metal, an appealing, highly lustrous and reflective appearance.

The laminate material can be used as an overwarp, as indicated, or it can be employed in the formation of the package itself. Generally, it is so arranged that the paper layer is exposed on the exterior of the package since it is readily made highly decorative by printing and is well suited for printing thereon directions and advertising. When a liquid is packaged in a packge formed of the laminate material the polyolefin layer ideally forms the inner layer, although the paper layer could be used as the inner layer if a high wet-strength paper, such as a resin impregnated paper is employed.

Any type of paper and paper thickness can be employed as the substrate layer, although in keeping with the precepts of the invention a relatively thin and flexible paper layer is advantageously utilized. Thus, without attempting to limit the type of paper that can be employed, presently contemplated is paper, paperboard and the like from straw, bark, wood, cotton flax, corn stalks, sugar cane bagasse, bamboo, hemp and similar cellulosic materials prepared by such processes as the soda, sulfite or sulfate (Kraft) processes, the neutral sulfite cooking processes, alkali-chlorine processes, nitric acid processes, semichemical processes, etc. Any of the treated, filled, sized or resin-impregnated papers and the like can be employed, however, generally to be avoided are materials in or on the paper surface that tend to interfere with the adhesion of the polyolefin layer to the paper substrate.

The non-aromatic hydrocarbon olefin polymer that is extrusion coated over the paper substrate and over the metal coating or deposit according to the present invention are generally prepared by polymerization of olefin and preferably monoolefinic aliphatic olefin monomers such as ethylene (including polymerization to low density and high density or linear polyethylene), propylene, butylene and so forth (including polymerizable mixtures thereof) that contain from 2 to about 8 carbon atoms, which monomeric olefins are frequently known as being 1-olefins due to their characteristic terminally unsaturated structures.

The polyolefin can be applied to the paper substrate or surface of the metal deposit, whichever is applicable, from an extruder of any conventional or desired construction, adapted to expel a falling sheet-like layer or curtain of molten polyolefin through a suitable die orifice onto the paper or metal surface. It is generally advantageous to maintain the polyolefin in the extruder, particularly when it is polyethylene, at a temperature sufficiently high to ensure its remaining in a fused and molten condition after being passed from the die to fall through the air as a layer on the surface to be coated. Thus, it is generally desirable for the extruded polymer, when it is polyethylene for example, to make contact with the surface to be coated while it is at a temperature of at least about 350–375° F. (at actual contact or juncture with the surface). This generally requires the molten polymer in the extruder barrel, as it leaves the die lips, to be at a temperature between about 550 and 600° F.

In this connection, although the molten polyolefin may be passed any distance through the atmosphere from the outlet of the die to the point of juncture with the surface to be coated, it is generally advantageous for a distance of not more than 12, advantageously about 6 to 10, inches to be utilized.

Immediately upon being applied, the polyolefin layer from the molten sheet is chilled, solidified and laminated in place by the action of a shiny chill roll which is maintained at a temperature above the sticking temperature of the polyolefin but below its fusion point, which temperature, frequently, is most advantageously maintained in the range from about 80 to 100° F.

After being laminated to the paper substrate, the composite product may be taken up for by any suitable means or in any desired manner, such as the onto a take-up roll and stored prior to being coated on the polyolefin surface with the metal deposit in a vacuum chamber.

Any desirable thickness of the polyolefin can be applied over the paper substrate and metal deposit. With the paper, it is important that a thick enough layer be used to assure a relatively smooth surface and fill the imperfections of the paper surface so that out-gassing of the paper and the objectional results thereof are prevented. The ultimate use designed for the laminate product will also influence the thickness of the polyolefin layer. Advantageously, a polyolefin layer is applied having a thickness between about ¼ mil and about 10 mils, and frequently the beneficial thickness will run about ½ to 2 mils.

The deposit of the metal coating over the polyolefin layer is obtained by known thermal evaporation or cathodic sputtering methods. In an advantageous thermal evaporation method, a sheet of the polyolefin coated paper is placed in or passed through a high-vacuum chamber such that the polyolefin surface is in apposition to a grid, coil, powder, sheeting or other form of the metal to be employed in the coating. Of course, particularized techniques may also be employed for the purpose. The metal is heated by suitable heating grids, trays, coils or other heating apparatus to volatilize the metal, whereupon it condenses as a thin deposit on the polyolefin surface. Preferably, the atoms of the volatilized metal should pass directly from the source to the surface of the polyolefin to be coated without encountering molecules of the residual atmosphere in the evacuated chamber. Consequently, the state of evacuation of the chamber should be high enough so that the mean free path of the metal vapor atoms exceeds the distance from the source to the surface of the polyolefin surface. Temperatures of the metal source which greatly exceed the volatilization temperature of the metal under the conditions employed should be avoided, since this may result in too high a vapor density of the gaseous metal giving rise to a pulverulent deposit. It has been found, however, that specular adherent coatings may be obtained even for high metal-vapor densities by ionizing the gaseous metal by means of auxiliary high potential electrodes.

Any metal capable of being vacuum metallized as described can be utilized in the practice of the present invention including aluminum, magnesium, tin, lead, nickel, zinc, gold, silver, etc. Preferably, tin is employed, especially when the laminate material is used to package food, cosmetics, medicinals and the like products. This is because aluminum, for reasons not fully understood at this time, when vacuum metallized upon a polyolefin surface has been found to produce a generally offensive odor which is apt to permeate and contaminate the food or other commodities packaged therein. When tin is used no such odor is observed.

Actually, only a very thin film of metal need be deposited on the surface of the polyolefin surface. Generally, the thickness of the metal deposit does not exceed a layer on the order of about 0.00004 inch (0.04 mil or about 0.001 millimeter) or so, and generally is in the neighborhood of 2 to $3 \times 10^{-6}$ inch thick. Thicknesses are conveniently measured by electro conductivity methods.

After being provided with the coating of metal, the composite structure of paper/polyolefin/metal is then processed through a second polyolefin extrusion to apply over the metal deposit a layer of polyolefin, which may be the same or a different polyolefin than that is applied over the paper, according to the procedure described above. above.

If desirable or necessary, either the paper or polyolefin layer applied thereover or metal layer may be provided with beneficial adhesion promoting agents or other treatments such as oxidizing treatments by exposing the surface to a methane flame or to an electrostatic treatment in order to effect a tighter and more durable bond between the respective layers of the present composite laminate structure. As adhesion promoting agents, such items as the organic titanates can be used. Advantageously the polyethylene imines which are of the general structure:

$$H-(-CH_2-CH_2-NH-CH_2-CH_2-NH-)_n-H$$

in which n has a numerical value of at least 1 and may be a larger, plural integer having a value as great as 1000–2000 and more are employed as adhesion promoting agents. Thus, when a polyethyleneimine is utilized for treating the surface of the paper substrate, polyolefin or metal layers, it may be of any desired molecular weight in which the material can be obtained. It is generally most advantageous, however, to avoid use of very low molecular weight materials having excessive volatilities.

As is apparent, other polyalkylene imines equivalent to polyethyleneimines (obtained by polymerization, in the known way, of the corresponding alkylene imines) may also be utilized as an intermediate adhesion-promoting coat to treat the applicable surface in place of, or in combination with, the polyethyleneimine. Ordinarily it is of greatest practical significance for these to include any of the homologous polyalkylene imines which are comprised of alkylene units of less than about 4 carbon atoms. In most cases, although no limiting implications are intended, the polyalkylene imines of greatest interest to employ are the relatively low polymer, water-soluble materials whose viscosity in 20 percent aqueous solution at 20° C. are on the order of 100 poises.

Only a very small quantity of the polyalkylene imines need be deposited as an intermediate adhesion promoting coating on the surface to be coated with the polyolefin or metal. In general, an amount between about 5 grams and 100 grams per thousand square feet of surface are suitable to facilitate and promote the adhesion of the deposited layer. Frequently, between about 20 and 50 grams per thousand square feet provides an entirely satisfactory result.

Although it can be directly applied if desired, the deposition of the polyalkylene imine is generally better and more conventionally and easily accomplished from a solution or dispersion of the adhesion-promoting agent in a suitable solvent, such as acetone, methyl ethyl ketone, methyl isopropyl ketone, lower alkyl alcohols (particularly those of less than 4 carbon atoms), etc. Methanol, ethanol and isopropanol are oftentimes found to provide optimum solvent behavior for the polyalkylene imine between about 1/8 and 1/2 percent by weight of the dissolved adhesion promoting agent. This facilitates the uniform and general deposition over the surface to be coated of the relatively minute quantities of polyalkylene imine needed for the intermediate adhesion-promoting coating on the surface prior to deposit or placement of the polyolefin polymer layer or metal layer.

In order to further illustrate the present invention several different laminate structures in accordance with the herein teaching were prepared and tested. The laminate structures are prepared by first treating one of the surfaces of a paper substrate with a solution of polyethyleneimine. About a 1.5 weight percent solution of the polyethyleneimine in ethanol is applied to one of the surfaces of a paper substrate with a gravure roll, after which the substrate is dried at about 150° F. in an oven leaving a deposit of about 15 grams of polyethyleneimine per 1000 square feet of paper surface.

The treated paper is taken up on a stock roll and then positioned on the delivery roll of an extruder. The treated roll is delivered to the nip rolls of an extruder at a linear rate of about 100 feet per minute. The paper is passed between the rolls, consisting of back up roll and a shiny chill roll (about 80° F.), and about a 0.5–1 mil layer of polyethylene is applied to the polyethyleneimine treated surface by feeding a molten polymer layer in the form of a falling sheet or curtain (through about an 8-inch fall) from the die lip to the nip of the rolls. The temperature of the polyethylene in the barrel of the extruder is about 600° F. Its temperature at contact with the paper substrate is about 375° F. The polymer is cooled and solidified by the chill roll, and the coated paper is wound on a storage roll. Some of the polyethylene surfaces are then passed over in apposition to an electrostatic discharge to treat the surface in order to effectuate better adherence of the tin coating.

The roll of polyethylene coated paper is then placed in a vacuum metallizer and threaded up such that the web or rolled sheet is unwound from the delivery roll, passes under a chill roll positioned above the crucibles, the polyethylene surface facing the crucibles, and taken up on a take-up roll. A quantity of tin is placed in several crucibles under and aligned along the length of the chill roll so that the full width of the surface will receive a deposit of tin. A vacuum of about 10 microns mercury is effected in the metallizer and the crucibles are heated to about 1300° C. The web is thus coated with a thin tin deposit at a rate of about 80–175 feet per minute. An excellent, lustrous, uniform layer of tin about 0.000002 inch thick on the polyethylene surface is produced and there is no evidence of pin-holding nor of any offensive odor.

Subsequently, the tin surface is provided with a polyethylene coating in the manner described above for applying the polyethylene coating to the paper substrate. The resulting laminate structures have good appearance, are odor free, light weight, flexible, possess highly acceptable barrier properties and are readily heat sealable to good seal strengths. The results of various tests performed on the laminate structures are set forth in the following table.

| Laminate Structure—Paper (wt./ream)/Polyethylene (PE) (wt./ream)/Tin/Polyethylene (PE) (wt./ream) | Heat Seal Strength [3] (lb.) | Moisture Vapor Transfer Rate (grams moisture/ 24 hrs./100 in.²) | Gas Transfer Rate (cc. gas/ 24 hr./100 in.²) |
|---|---|---|---|
| 30 lb. KVP Kraft/7 lb. PE [1]/Tin/10 lb. PE | 3.15 | | 4.68 |
| 30 lb. KVP Kraft/7 lb. PE [2]/Tin/22 lb. PE | 4.11 | | 3.00 |
| 25 lb. Sulfite/7 lb. PE [1]/Tin/22 lb. PE | 4.74 | | 12.0 |
| 25 lb. Sulfite/7 lb. PE [2]/Tin/22 lb. PE | 4.36 | | 5.8 |
| 25 lb. Pouch/7 lb. PE [1]/Tin/22 lb. PE | 4.10 | [4] 0.012  [5] 0.024 | 3.98 |

[1] PE surface electrostatically treated.
[2] PE surface not electrostatically treated.
[3] Heat seal made at 300° F., 30 p.s.i.g., at 1 second dwell, seal formed between polyethylene surfaces pressed together, heat applied from paper side of laminate structure, measured on Instrom tester.
[4] Flat.
[5] Creased.

Packages made from the laminate materials by heat sealing are separately filled with a liquid shampoo, a hair cream dye solvent, a sour cream mix, calcium chloride, water and a concentrated liquid chlorine bleach. All of these materials are satisfactorily contained in these packages at room temperature.

What is claimed is:

1. Composite structure which comprises, in intimate joined lamination, a first substrate layer of paper, said substrate layer being uniformly coated with a second layer of a film-forming non-aromatic hydrocarbon olefin polymer, said second layer of olefin polymer being uniformly coated with a third layer of a metal, said metal layer being less than about .04 mil thick, and a fourth layer of a film-forming non-aromatic hydrocarbon polymer being uniformly coated over said third layer of metal.

2. The composite structure of claim 1, wherein said metal layer is tin.

3. The composite structure of claim 1, wherein said olefin polymer of said second and fourth layers is a polymer of a monoolefinic monomer containing from 2 to 8 carbon atoms.

4. The composite structure of claim 3, wherein said olefin polymer is polyethylene.

5. The composite structure of claim 1 and including interposed between said first substrate layer and said second layer of olefin polymer an intermediate adhesion promoting layer of a polyalkyleneimine comprised of alkylene units containing from about 2 to 4 carbon atoms.

6. The composite structure of claim 5, wherein said polyalkyleneimine is polyethyleneimine.

7. Method for preparing a composite laminate structure which comprises
(a) depositing a molten layer of a film-forming non-aromatic hydrocarbon olefin polymer over a paper substrate and immediately cooling said deposited olefin polymer to provide a smooth, uniform surface quality susceptible to having deposited thereon a smooth lustrous metal layer;
(b) depositing a uniform layer of a metal over said deposited olefin polymer layer by passing said olefin polymer-coated paper substrate through a chamber adapted to vaporize said metal and deposit and condense said vaporized metal on said applied olefin polymer layer; and
(c) depositing a molten layer of a film-forming, non-aromatic hydrocarbon olefin polymer over said layer of metal and cooling said applied olefin polymer to solidify same on said metal layer.

8. The method of claim 7, wherein said deposited layer of metal is less than about 0.04 mil. thick.

9. The method of claim 7, wherein said metal layer is tin.

10. The method of claim 7 and including the intermediate step before depositing said olefin polymer over said layer of metal of subjecting said layer of metal to an electrostatic discharge.

11. The method of claim 7, wherein said olefin polymer is a polymer of a monoolefinic monomer containing from 2 to 8 carbon atoms.

12. The method of claim 11, wherein said olefin polymer is polyethylene.

13. The method of claim 8 and including the intermediate step before depositing said olefin polymer over said paper substrate of applying to the surface of said paper substrate over which said olefin polymer is to be applied a polyalkyleneimine comprised of alkylene units containing from 2 to 4 carbon atoms.

14. The method of claim 13, wherein said polyalkyleneimine is polyethyleneimine.

15. The method of claim 7 wherein said olefin polymer layer deposited on said paper substrate is chilled, solidified and laminated in place by the action of a chill roll maintained at a temperature above the sticking temperature of the polyolefin but below its fusion point.

16. The method of claim 15 wherein said chill roll is maintained at a temperature in the range from about 80° to about 100° F.

17. The method of claim 15 wherein said chill roll is positioned from about 6 to about 12 inches from the point of extrusion of said molten olefin polymer deposited on said paper substrate.

18. Method for preparing a composite laminate structure which comprises
(a) applying to the surface of a paper substrate a polyalkyleneimine comprised of alkylene units containing from 2 to 4 carbon atoms;
(b) depositing over said polyalkleneimine-treated surface of said paper substrate a molten layer of a film-forming, non-aromatic hydrocarbon olefin polymer and immediately cooling said applied olefin polymer to solidify same on said substrate;
(c) depositing a uniform layer of tin over said deposited olefin polymer layer by passing said olefin polymer-coated paper substrate through a chamber adapted to vaporize tin and deposit and condense said vaporized tin on said applied olefin polymer layer;
(d) subjecting said deposited layer of tin to an electrostatic discharge; and,
(e) depositing a molten layer of a film-forming, non-aromatic hydrocarbon olefin polymer over said layer of tin and cooling said applied olefin polymer to solidify same on said tin layer.

19. The method of claim 18 wherein said olefin polymer layer deposited on said paper substrate is chilled, solidified and laminated in place by the action of a chill roll maintained at a temperature above the sticking temperature of the polyolefin but below its fusion point.

References Cited

UNITED STATES PATENTS

| | | | |
|---|---|---|---|
| 3,262,808 | 7/1966 | Crooks et al. | 117—93.1 X |
| 2,368,140 | 1/1945 | Johnson | 161—250 X |
| 2,562,182 | 7/1951 | Godley | 117—60 |
| 2,663,652 | 12/1953 | Railing. | |
| 2,778,760 | 1/1957 | Hurst | 161—250 X |
| 2,961,522 | 11/1960 | Hammer | 117—107.1 X |
| 3,113,888 | 12/1963 | Gold et al. | 117—107 X |
| 3,140,196 | 7/1964 | Lacy et al. | 156—244 X |
| 3,152,694 | 10/1964 | Nashed et al. | |
| 3,196,063 | 7/1965 | Paquin et al. | 117—93 X |
| 3,227,132 | 1/1966 | Clough et al. | 117—107.1 X |
| 3,230,135 | 1/1966 | Hurst. | |
| 2,863,179 | 12/1958 | Gaugler | 117—107 |
| 2,971,862 | 2/1961 | Baer et al. | 117—71 |
| 3,033,707 | 5/1962 | Lacy et al. | 117—76 |
| 3,281,257 | 10/1966 | Rosen | 117—71 |

ALFRED L. LEAVITT, Primary Examiner

C. K. WEIFFENBACH, Assistant Examiner

U.S. Cl. X.R.

117—50, 76, 107, 155, 160; 161—216, 250